United States Patent Office 3,350,247
Patented Oct. 31, 1967

3,350,247
METHOD OF PROTECTING FINISHED SURFACES
David J. Steinberg, West Englewood, N.J.
(215 Little Falls Road, Fairfield, N.J. 07007)
No Drawing. Filed Feb. 4, 1966, Ser. No. 525,132
6 Claims. (Cl. 156—1)

This application is a continuation-in-part of my co-pending application, Ser. No. 154,346, filed Nov. 22, 1961, entitled, Protection of Finished Metallic Surfaces, now abandoned.

This invention relates to the field of protection of finished metallic and other finished surfaces during fabricating operations whereby direct contact with the surfaces, which might mar or otherwise damage the surfaces, is prevented. Reference is made to my prior patent, Number 3,054,708, granted Sept. 18, 1962, entitled Protection of Polished Metal Surfaces, and my now abandoned application, Ser. No. 126,681, filed July 25, 1960, entitled, Device for Applying Synthetic Resinous Sheet Material to Metal Surfaces; the present application teaching an improved method of the type disclosed in the former patent which may be used in conjunction with the device disclosed in the latter mentioned application.

In the protecting of metal surfaces as taught by the above mentioned patent, Number 3,054,708, the basic concept includes the adhesion of the protective synthetic resinous material by electro-static attraction under pressure to the surface to be protected. The more surface covered, the greater the resulting bond or adhesion. On very smooth surfaces, there is a greater surface contact available to the smooth surface of the protective material, and it is correspondingly simple to obtain greater adhesion to such surface when pressure is applied. On more irregular surfaces, there is less available surface contact, owing to the fact that the protective material contacts the high points of the surface to be protected, the adhesion being thereby reduced to only the areas of contact. Air is thus entrapped in the declivities which are uncontacted by the protective material, which contributes to the reduction of the bond on the contacted areas because of resultant air pressure. With the growing use of such sheet metallic materials as aluminum, chrome steel and stainless steel, each finished in less than a high mirror finish, it is necessary to contact as great a percentage of the total surface area as possible to provide sufficient adhesion to permit the protective material to adhere to the metal surface during subsequent handling and forming operations. This is particularly necessary where satin finish or scratch finish surfaces are provided on the metal to be protected, or where the finished surface is coated with epoxy resins, vinyl resins, enamel, and the like. It is also true where the finish is of non-metallic materials, such as acrylic sheeting, plastic laminates, plywood panelling and the like.

In order to make the protective material available to a greater percentage of the protected area, it must be made to conform to the contours of the surface irregularities in the protected surface. Under high magnification, it will seen that even surfaces that appear to the naked eye as perfectly smooth will have many irregularities (proclivities and declivities).

It is accordingly among the principal objects of the present invention to provide an improved method for protecting finished surfaces of a relatively unsmooth nature through electro-static adhesion.

Another object of the invention lies in the modification of an existing method and means heretofore effective in the protection of relatively smooth surfaces, to particularly suit the same for use in conjunction with the protection of relatively unsmooth surfaces in a substantially similiar manner.

Another object of the invention lies in the provision of an improved method for protecting finished metallic surfaces in which only a single additional step is necessary as contrasted with the prior method to accomplish the desired end.

A feature of the invention lies in the fact that existing devices used in laminating the synthetic resinous protective material to the finish metallic surface may be employed in performing the within disclosed method with only minor modifications.

Another feature of the invention lies in the fact that the disclosed method may be used with equal facility on either metallic or non-metallic surfaces.

These objects and features, as well as other incidental ends and advantages, will more fully appear in the progress of the following disclosure, and be pointed out in the appended claims.

In accordance with the present invention, I have found that relatively rough finished surfaces may be protected in the following manner.

The metal strip, or the material to be protected by the synthetic resinous material, is subjected to a low heat. This is done just prior to the application of the synthetic resinous material to the metallic strip or surface to be protected, and as close to the point of application as is mechanically feasible. The heat imparted to the metallic strip or material to be protected is transferred to the synthetic resinous material when the surface to be protected and the synthetic resinous material come into mutual contact at the point of application. The heat so transferred softens the synthetic resinous material, so that under pressure the same will permanently conform to the microscopic contour of the entire surface area available, or at least a very substantial amount of the available area. Thus, declivities as well as proclivities will be contacted under pressure. The term molecular orientation is used herein to describe the above operation. This will permit the static electrical charge to be available to the total area for effective adhesion. In addition, the heat is employed to expand the occluded air trapped in the declivities of the surface, so that upon subsequent cooling, the differential air pressure will be added to the force obtained by the electro-static charge tending to retain the protective sheet upon the protected surface. The degree of heat employed, and the range of pressure with which the protective material is employed, will vary for the various surfaces to be protected. Among the factors to be considered are:

(a) the reflectivity of the surface,
(b) the degree of surface irregularity (i.e., the lack of surface smoothness under high magnification),
(c) the weight of the metal or material being protected, and
(d) the gauge of the protective material being applied.

Under no circumstances must the temperature exceed the point at which the protective material becomes weakened so that it will not withstand the subsequent handling of fabrication processes to which the metal or protected surface is subsequently subjected. I have found that excessive temperatures result in a very high adhesion factor, with a corresponding loss of strength in the protective material to a degree where difficulty is encountered in stripping the protective material from the protected surface at the completion of the subsequent handling in fabrication. In addition, where devices of the type disclosed in my above mentioned patent, Number 3,054,708, are employed, excessive temperatures may also result in the protective material sticking to the rollers used to compress the protective material to the protected surface. Conversely, too little heat may result in inadequate adhesion, and so little expansion of the air trapped in the declivities of the material that the additional adhesive effect obtained by the differential air pressures on either side of the protective sheet occurring when the protected surface has cooled is lost. Evacuation of the air by expansion also serves to remove loose foreign matter which might act as an insulator prior to adherence of the sheet.

One effective and simple means I have found to apply the heat to a metal strip is a refractory-type gas-fired radiant burner. Burners of this type are compact, and can easily be positioned close to the pressure rollers of the roll-on applicator, so that there is very little heat lost before the time the metal strip or the surface being protected comes into contact with the protective material at the pressure rollers. The burner may be positioned on a stand underneath the strip or sheet to be protected, and the heat may be regulated automatically to maintain the proper temperature under any application speed conditions. This may be done through various electronic sensing devices, such as recording thermocouples and electronic controls known in the burner art. I have found that under proper temperature regulation, the burner will not discolor or tarnish the metal surface in any way.

Another suitable means of applying heat is by use of a heated pressure roller about which the protective thermoplastic sheet may pass to be sufficiently softened by the time it reaches the point of application. Reference is made to my co-opending application, Ser. No. 511,192, filed Dec. 2, 1965, which discloses a suitable heated pressure roller for this purpose.

As disclosed in my above mentioned patent, the protection of the finished surfaces continues to be a "in line" operation. For very high speeds, additional burners may be necessary to raise the temperature of the metallic strip or sheet being protected to that necessary for most efficient application. In this connection, where additional pressures and speeds are necessary for the application of the protective material, the introduction of a double set of pressure rollers allows greater latitude in application pressures.

As the effect of the heated metal upon the protective material will be to soften the same so that it may flow into the declivities in the protective surface, it is preferable that conductive rubber rollers be used for applying the pressure, so that static charges will not build up in them to obviate the adherence of the protective material to the metal strip. 80 degree to 90 degree durometer rubber is suitable, although lower durometer rubber may be employed where the material being protected may be fractured or injured by a harder rubber.

In each of the following examples, the protective material employed was polyvinylidene chloride, also known as 1,1-dichloroethylene, having a thickness of .135 mil and a width of 24 inches (presently available from the Dow Chemical Company of Midland, Mich.). In each case, a device of the type shown and described in my now abandoned application, Ser. No. 126,681, was employed, and sheet metallic material fed therethrough. To prevent excessive adherence between the opposed surface of the protective strip and the undersurface of the metal, a suitable starch applicator was installed on the production line to cover the exposed surface of the protected material with a non-corrosive and non-abrasive coating prior to complete cooling.

*Example 1*

Material: Coated aluminum, 20 gauge.
Finish: Alkyd enamel.
Temperature of metal at application: 150 degrees F.
Feed speed: 13½ feet per minute.
B.t.u. loss per hour: 20,000.
Pressure: 40 pounds per square inch.

*Example 2*

Material: Brass, 30 gauge.
Finish: Smooth, dry, rolled.
Temperature of metal at point of application: 150 degrees F.
Feed speed: 13½ feet per minute.
B.t.u. loss per hour: 50,000.
Pressure: 40 pounds per square inch.

*Example 3*

Material: Copper, 40 gauge.
Finish: Smooth, dry, rolled.
Temperature of metal at point of application: 150 degrees F.
Feed speed: 13½ feet per minute.
B.t.u. loss per hour: 80,000.
Pressure: 40 pounds per square inch.

*Example 4*

Material: Stainless steel, 25 gauge.
Finish: Bright.
Temperature of metal at point of application: 150 degrees F.
Feed speed: 13½ per minute.
B.t.u. loss per hour: 35,000.
Pressure: 40 pounds per square inch.

*Example 5*

Material: Stainless steel, 25 gauge.
Finish: Bright.
Temperature of metal at point of application: 125 degrees F.
Feed speed: 13½ feet per minute.
B.t.u. loss per hour: 21,000.
Pressure: 25 pounds per square inch.

*Example 6*

Material: Copper, 40 gauge.
Finish: Smooth, dry, rolled.
Temperature of metal at point of application: 165 degrees F.
Feed speed: 13½ feet per minute.
B.t.u. loss per hour: 80,000.
Pressure: 80 pounds per square inch.

*Example 7*

Material: Stainless steel, 30 gauge.
Finish: Bright.
Temperature of metal at point of application: 125 degrees F.
Feed speed: 13½ feet per minute.
B.t.u. loss per hour: 20,000.
Pressure: 25 pounds per square inch.

*Example 8*

Material: Chrome-plated steel, 30 gauge.
Finish: Satin.
Temperature of metal at point of application: 165 degrees F.
Feed speed: 13½ feet per minute.
B.t.u. loss per hour: 41,666.
Pressure: 60 pounds per square inch.

*Example 9*

Material: Nickel-plated steel, 30 gauge.
Finish: Satin.
Temperature of metal at point of application: 165 degrees F.
Feed speed: 26 feet per minute.
Pressure: 40 pounds per square inch.

*Example 10*

Material: Steel, 20 gauge.
Finish: Alkyd resin painted.
Temperature of metal at point of application: 165 degrees F.
Feed speed: 13½ feet per minute.
B.t.u. loss per hour: 25,000.
Pressure: 40 pounds per square inch.

Each of the above examples produced an adequate adherence between the protective film and the surface being protected, and from a comparison, for example, of Examples 4 and 5, it will be observed that suitable results can be obtained over a range of temperatures and pressures.

The use of a heated roller to apply the protective film, in lieu of the gas-fired burners referred to hereinabove, is particularly desirable where non-metallic surfaces are being protected, and the direct application of heat to the protected material is to be avoided. In the following examples, application of the protective material was made by use of a roller of the type described in the above mentioned co-pending application, Ser. No. 511,192. In addition to the polyvinylidene chloride used in the above examples, I have found that other synthetic resinous materials which are inherently less capable of retaining electrostatic charges than polyvinylidene chloride are also suitable for use in a similar manner. Polyvinyl chloride, for example, may be used in many applications, as can suitably ionized polyethylene, polypropylene, and other polyolefin sheeting. The ionization of the surfaces of these materials in a manner well known in the art to render the same receptive to printing inks simultaneously renders the same receptive to static charges, thus materially increasing the electrostatic attraction to an acceptable level.

The following examples are illustrative.

Example 11
Protective material: Polyvinylchloride.
Protected surface: Acrylic sheeting.
Temperature of pressure roller at surface: 125 degrees F.
Feed speed: 13½ feet per minute.
Pressure: 30 pounds.

Example 12
Protective material: Ionized polyethylene sheeting.
Protected surface: Plastic laminate.
Temperature of pressure roller at surface: 125 degrees F.
Feed speed: 13½ feet per minute.
Pressure: 30 pounds.

Example 13
Protective material: Ionized polypropylene.
Protected surface: Lithographed gypsum wallboard.
Temperature of pressure roller at surface: 125 degrees F.
Feed speed: 13½ feet per minute.
Pressure: 60 pounds per square inch.

Example 14
Protective material: Ionized polyolefin.
Protected surface: Painted plywood.
Temperature of pressure roller at surface: 125 degrees F.
Feed speed: 13½ feet per minute.
Pressure: 60 pounds per square inch.

Example 15
Protective material: Rubber hydrochloride.
Protected surface: High pressure plastic laminate.
Temperature of pressure roller at surface: 100 degrees F.
Feed speed: 13½ feet per minute.
Pressure: 30 pounds per square inch.

In each case, the thickness of the protective material was one mil. Satisfactory adherence was obtained in each case, and the protective material was readily removed when desired without damage to protective sheeting or protected surface.

In each of the above examples, the heat supplied is sufficient to permit molecular reorientation of those protective materials which are molecularly oriented, but not sufficient to allow actual melting of the protective material.

I wish it to be understood that I do not consider the invention limited to the precise details set forth in this specification, for obvious modifications will occur to those skilled in the art to which the invention pertains.

I claim:

1. In a method of temporarily protecting finished surfaces, including providing an electro-statically charged flexible sheet of planar synthetic resinous thermoplastic material capable of retaining said electro-static charge such that it will be attracted to the surface to be protected, and applying the same under pressure to said finished surfaces, the steps of heating said sheet to a point between 100 and 165 degrees F., and above the minimum at which said sheet may be molecularly reoriented to conform to the surface irregularities in said finished surfaces, and below the melting point of said sheet, and applying said sheet directly to said finished surface under pressure, whereby the contacting surface of said sheet may be softened and hot-worked into said surface irregularities.

2. The method steps in accordance with claim 1 in which said thermoplastic material is polyvinylidene chloride.

3. The method steps in accordance with claim 1 in which said thermoplastic material is polyvinyl chloride.

4. The method steps in accordance with claim 1 in which said thermoplastic material is ionized polyethylene.

5. The method steps in accordance with claim 1 in which said thermoplastic material is ionized polypropylene.

6. The method steps in accordance with claim 1 in which said thermoplastic material is ionized polyolefin.

References Cited

UNITED STATES PATENTS

| Number | Date | Name | Class |
|---|---|---|---|
| 2,392,695 | 1/1946 | Rohdin | 156—289 |
| 2,120,461 | 6/1938 | Copeman | 29—423 |
| 2,293,887 | 8/1942 | Chamberlain | 40—125 |
| 2,476,145 | 7/1949 | Gwyn et al. | 117—6 |
| 2,679,969 | 6/1954 | Richter | 229—3.5 |
| 3,075,868 | 1/1963 | Long | 156—244 X |
| 3,191,286 | 6/1965 | Armstrong et al. | 29—424 |

EARL M. BERGERT, *Primary Examiner.*

J. P. MELOCHE, *Assistant Examiner.*